Aug. 31, 1965  C. VAN DER LELY ETAL  3,203,703

DEVICE FOR SPREADING GRANULAR OR POWDERY MATERIAL

Original Filed Jan. 26, 1959

INVENTOR.
CORNELIS & ARY VAN DER LELY 3,203,703
DEVICE FOR SPREADING GRANULAR OR
POWDERY MATERIAL
Cornelis van der Lely, Zug, Switzerland, and Ary van der Lely, Maasland, Netherlands, assignors to C. van der Lely N.V., Maasland, Netherlands, a Dutch limited-liability company
Original application Jan. 26, 1959, Ser. No. 788,884, now Patent No. 3,038,643, dated June 12, 1963. Divided and this application May 31, 1962, Ser. No. 199,020
6 Claims. (Cl. 275—15)

The invention relates to a device for spreading granular of powdery material, comprising a material container from which the material to be spread is delivered, in which container an agitating member is arranged serving to ensure a proper delivery of the material from the container, and this application is a divisional application of Serial No. 788,884, now Patent No. 3,038,643.

In accordance with the invention there is provided a device of the kind set forth, wherein the agitating member is provided with arms extending downwardly in the container and being driven for movement relative to the container walls during operation by a mechanism rotatable about an axis of rotation, said agitating member being mounted to the upper end of a shaft and being provided with portions extending sidewardly, to which portions the upper ends of the arms extending downwardly are mounted, said sidewardly extending portions being provided with means to be coupled with the said shaft.

By employing an agitating member with downwardly extending arms, in particular the material in the lower part of the container can be kept loose in an effective way to be delivered from the container.

For a better understanding of the invention and to show how the same can be carried into effect, reference will now be made to the accompanying drawings, in which.

Figures 1, 2:
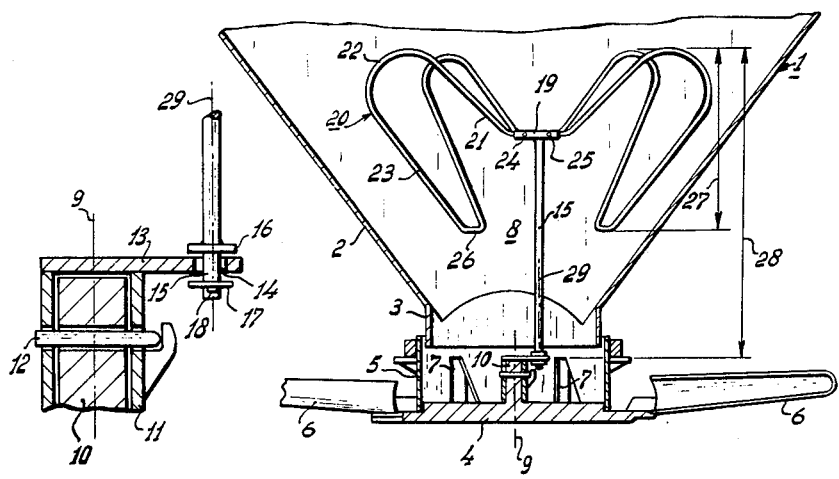
FIG. 1 is a sectional view of the container with an agitating member of a device for spreading granular or powdery material.
FIG. 2 is, on an enlarged scale, a sectional view of a detail of the device.

The device in accordance with the embodiment has a container 1 comprising a pyramid-shaped portion 2 and a cylindrical portion 3. Underneath the container 1 is arranged a moving mechanism shaped in the form of a disc 4 which constitutes the bottom of the container. Between the disc 4 and the cylindrical portion 3 of the container 1 is provided a cylindrical annulus 5, which constitutes the link between the container 1 and the disc 4. The annulus 5 bears on the disc 4 and fits at its top end around the cylindrical portion 3 of the container. The disc 4 which is caused to rotate during operation, extends beyond the container, where it is provided with spreading members 6 which extend beyond the disc 4 so that the device may be used as a distributing machine. For the delivery of the material from the container, the annulus 5 has various outlet ports 7. In order to ensure a proper delivery of the material from the container, an agitating member 8 is arranged therein.

The agitating member 8 is coupled with the disc 4 by means of the lower end of a shaft 15, the disc being rotatable about the axis 9. For coupling the agitating member 8 to the disc 4, the latter has a shaft 10 the centre line of which coincides with the axis 9. The shaft 10 is provided with a sleeve 11, which is secured against displacement on the shaft 10 by means of a pin 12. The sleeve 11 is provided at its upper end with a strip 13 with a hole 14, which is located at a distance from the rotary shaft 9 of the mechanism 4. Through the hole 14 is taken the lower end of the shaft 15, which is secured against removal from the hole 14 by means of a plate 16, which is welded to the shaft 15, and by means of a ring 17, which is held on the shaft 15 by means of a split pin 18. The shaft 15, which extends upwardly, is provided at its top end with a round plate 19. To the plate 19, which extends horizontally on the central position shown of the shaft 15, side arms 20 are welded which over a first portion 21 extend upwardly in the container. The plate 19 is provided with six arms 20 which are formed pairwise from one piece of resilient material, the ends which are not connected to each other being welded to the plate 19. Each side arm 20 is welded to the plate 19 only at its higher end. From the plate 19 a first portion 21 of the side arm, this portion being at an angle to the vertical shaft 15, goes over through a bend 22 into a second portion 23, which points downwardly from the bend and extends along the wall of the container. The portions 23 extending along the container wall are located, in this case, in an imaginary cone surface. In the central position shown of the shaft 15, the portions 23 forming downwardly extending arms are parallel to the container wall.

Only four of these side arms 20 are shown, two being omitted; the holes 24 and 25, intended for these two arms, are shown in the plate 19; the ends of the omitted side arms can be arranged therein.

The portions 23 of two adjacent side arms 20 formed pairwise from one piece of material, which portions are extending freely downwardly, are coupled with each other by a portion 26 lying substantially horizontal. The downwardly extending portions 23 have a height which is nearly half the height 28 of the agitating member with the shaft 15, and which is substantially equal to the height of the shaft 15. When the disc 4 rotates about the rotary shaft 9, the lower end of the shaft 15, the centre line 29 of which lies at a distance from the axis 9, will rotate about the axis 9. Owing to this the agitating member constituted by the side arms 20 and the rod 15 arranged centrally in the said member will move in the material in the container 1.

The side arms are capable of giving way readily in a resilient manner owing to the resilience of the material from which they are made. The resistance experienced by the side arms 20 in the material is, however, usually so heavy that the shaft 15 will always rotate in the hole 14, whereby, since the top end of the shaft 15 cannot always follow the movements of the lower end of the shaft 15, the side arms will continually perform a swinging motion.

During this movement the agitating member 8 with the side arms 20 will rotate about an axis constituted by the centre line 29 of the shaft 15, whereby owing to the fact that the lower end of the shaft 15 bears in the hole 14, the agitating member moves about pivot axes extending perpendicular to the centre line of the hole 14 and extending in a plane perpendicular to the axis 9.

The central portion of the agitating member to which the arms are mounted, i.e. the disc 19, can also have another form. The agitating member 8 with the freely downwardly extending arms 23 can also be coupled with a driving mechanism in another way then according to this embodiment to be moved relative to the container.

What we claim is:
1. A device for spreading material comprising a material container, said container decreasing in width towards its lower end, an agitator arranged within said container, said agitator having a shaft and downwardly extending arms, the upper ends of said arms being provided with laterally extending portions, means for connecting said portions to the upper end of said shaft, a rotating and driving mechanism pivotally connected to the lower end of said shaft for moving said agitator during operation, said laterally extending portions con- stituting arms made of a single piece of material, with said arms extending downwardly whereby said portions extend laterally and upwardly in the container from said shaft and lie with their outer ends near the container wall.

2. A device for spreading material comprising a material container, said container decreasing in width towards its lower end, an agitator arranged within said container, said agitator having a shaft and downwardly extending arms, the upper ends of said arms being provided with laterally extending portions, means for connecting said portions to the upper end of said shaft, a rotating and driving mechanism pivotally connected to the lower end of said shaft for moving said agitator during operation, two of said arms being coupled to each other with their lower ends.

3. A device for spreading material comprising a material container, said container decreasing in width towards its lower end, an agitator arranged within said container, said agitator having a shaft and downwardly extending arms, the upper ends of said arms being provided with laterally extending portions, means for connecting said portions to the upper end of said shaft, a rotating and driving mechanism pivotally connected to the lower end of said shaft for moving said agitator during operation, said downwardly extending arms being located substantially in the same conical surface.

4. A device as claimed in claim 3, wherein the said arms are rotatable around the center line of the agitator.

5. A device as claimed in claim 3, wherein the said mechanism has a disc rotatable about its axis of rotation said disc constituting at least partly the bottom of the container.

6. A device for spreading material comprising a material container, said container decreasing in width towards its lower end, an agitator arranged within said container, said agitator having a shaft and downwardly extending arms, the upper ends of said arms being provided with laterally extending portions, means for connecting said portions to the upper end of said shaft, a rotating and driving mechanism pivotally connected to the lower end of said shaft for moving said agitator during operation, said arms extending within a vertical plane in the container over a distance which is at least equal to half the height of the container and substantially equal to the height of said shaft.

References Cited by the Examiner

UNITED STATES PATENTS

| | | | |
|---|---|---|---|
| 232,328 | 9/80 | Brown | 259—135 |
| 280,437 | 7/83 | Armstrong | 275—15 |
| 969,359 | 9/10 | Goodrich | 259—134 X |
| 1,200,250 | 10/16 | Sinding-Larsen | 259—135 |
| 1,831,040 | 11/31 | Sowers | 259—135 |
| 1,948,021 | 2/34 | Burton | 222—404 X |
| 2,368,127 | 1/45 | Fasick | 222—232 |
| 2,369,508 | 2/45 | White | 222—228 X |
| 2,644,618 | 7/53 | Oehler | 222—228 X |
| 3,038,643 | 6/62 | Van Der Lely et al. | 222—228 X |

FOREIGN PATENTS

| | | |
|---|---|---|
| 238,799 | 1/61 | Australia. |
| 1,004,951 | 4/52 | France. |

LOUIS J. DEMBO, *Primary Examiner.*

RAPHAEL M. LUPO, *Examiner.*